United States Patent [19]

Krumme

[11] Patent Number: 4,752,673
[45] Date of Patent: Jun. 21, 1988

[54] AUTOREGULATING HEATER

[75] Inventor: John F. Krumme, Woodside, Calif.

[73] Assignee: Metcal, Inc., Menlo Park, Calif.

[21] Appl. No.: 445,862

[22] Filed: Dec. 1, 1982

[51] Int. Cl.⁴ .............................................. H05B 5/00
[52] U.S. Cl. ............................... 219/553; 219/10.41;
219/229; 174/126 CP
[58] Field of Search ............... 219/10.41, 10.43, 10.49,
219/10.51, 10.71, 10.75, 10.79, 229, 233, 241,
301, 553; 128/1.3, 303.1, 303.13, 303.14; 30/40;
174/40 R, 106 R, 126 CP

[56] References Cited

U.S. PATENT DOCUMENTS

| | | | |
|---|---|---|---|
| 1,975,436 | 10/1934 | Sorrel et al. | 219/10.41 |
| 2,181,274 | 11/1939 | Jackson et al. | 219/10.79 |
| 2,918,722 | 12/1959 | Kennmore | 174/126 CP |
| 3,218,384 | 11/1965 | Shaw | 174/40 R |
| 4,079,192 | 3/1978 | Josse | 174/126 CP |
| 4,091,813 | 5/1978 | Shaw et al. | 128/303.14 |
| 4,110,599 | 8/1978 | Offermann | 219/301 |
| 4,185,632 | 1/1980 | Shaw | 128/303.1 |
| 4,207,896 | 6/1980 | Shaw | 128/303.1 |
| 4,256,945 | 3/1981 | Carter et al. | 219/10.75 |
| 4,364,390 | 12/1982 | Shaw | 128/303.1 |
| 4,366,356 | 12/1982 | Ando | 219/301 |

FOREIGN PATENT DOCUMENTS 41-1743  2/1966  Japan .
41-2676  2/1966  Japan .
41-2677  4/1966  Japan .
41-7257  4/1966  Japan .

Primary Examiner—E. A. Goldberg
Assistant Examiner—Catherine M. Sigda
Attorney, Agent, or Firm—Hall, Myers & Rose

[57] ABSTRACT

An autoregulating electrically shielded heater employs a structure of two magnetically permeable members of different Curie temperatures and preferably differing resistivities. The two members are in electrical contact with one another; having at their interface a very low resistivity layer or member provided by copper or a like material. A first of the electromagnetic members has the lower Curie temperature and high resistivity while the other of said members has the higher Curie temperature of the two and preferably lower resistivity. A constant current a.c. source is connected to induce currents in the members parallel to their interface. Below the Curie temperature of the first member, current is substantially confined to a narrow region along a surface remote from the interface. Above the Curie temperature, some of the current spreads into the low resistance layer or member and into the second electromagnetic member where it is confined, due to skin effect to a narrow region adjacent the interface. The $I^2R$ heating is greatly reduced, 6 to 1 in a typical case, so that autoregulation of temperature occurs near the Curie temperature of the first member. Since the current in the second electromagnetic member is limited in its penetration by skin effect, a low frequency power supply may be employed in a thin device without radiation of the electromagnetic field.

18 Claims, 4 Drawing Sheets

AUTOREGULATING HEATER

RELATED APPLICATION

This application is related to my application, Ser. No. 430,317 filed on Sept. 30, 1982, now abandoned. A continuation-in-part, Ser. No. 543,443 was filed Oct. 19, 1983, now abandoned and continuation-in-part Ser. No. 543,443 filed Oct. 19, 1983, entitled: Autoregulating Electrically Shielded Heater; both cases assigned to the same assignee as the present invention.

BACKGROUND OF THE INVENTION

The present invention relates to autoregulating electric heaters and more particularly, to an electromagnetic auto-regulating electric heater operable with a low frequency energy source without radiating harmful electromagnetic fields and which has a high autoregulating power ratio; i.e., a high ratio of rates of generation of heat.

In the U.S. Pat. No. 4,256,945 of Carter and Krumme, there is described an autoregulating electric heater having a laminated structure; one lamina of which has high magnetic permeability and high resistance and another lamina of which is non-magnetic and has a low resistance (such as copper) in electrical contact, and therefore, thermal contact with the first lamina. This structure is adapted to be connected across a constant current, a.c., source such that the layers are in a sense in parallel across the source.

Due to skin effect, the current is initially confined to the high magnetic permeability, high resistance layer so that $P = KR_1$ where P is power, K is $I^2$ which is a constant, and R is the effective resistance of the permeable material at high current concentrations. The dissipation of power heats the layer until it approaches its Curie temperature. The permeability of the lamina decreases towards the level of the second layer, copper for instance, at about its Curie temperature. The current is no longer confined to the high resistivity first lamina by the magnetic properties of the first lamina, and spreads into the copper layer; the resistance to the current drops materially, the power consumed, $P = KR_2$ where $R_2 << R_1$, is greatly reduced and the heating effect is reduced to a level that maintains the device at or near the Curie temperature. The device thus thermally autoregulates over a narrow temperature range about the Curie temperature.

The current source employed in the aforesaid patent is typically a high frequency source, for instance, 8 to 20 MHz to insure that the current is confined to the thin, high resistance, magnetic layer until the Curie temperature of the magnetic material is attained. Specifically, the maximum regulation is achieved when the thickness of the magnetic layer is of the order of one skin depth at the frequency of operation. Under these circumstances, the maximum change in effective resistance of the structure is achieved at or about the Curie temperature. This fact can be demonstrated by reference to the equation for skin depth in a monolithic, i.e., non-laminar magnetic structure: $S.D. = 5030\sqrt{\rho/\mu f}$ cm, where $\rho$ is the resistivity of the material in ohm-cms, $\mu$ is magnetic permeability mu and f is frequency of the current. The field falls off in accordance with $e^{-x}$ where x is thickness/skin depth. Accordingly, in a monolithic structure, by calculation, 63.2% of the current is confined to one skin depth in the high mu material. In the region of the Curie temperature, where $\mu = 1$, the current spreads into a region $S.D. = 5030\sqrt{\rho/\mu f}$ cm. If mu was originally equal to 200(200-600 being possible), the skin depth in the region at the Curie temperature increases by the square root of 200; i.e., the skin depth in the monolithic structure is now 14.14 times greater than with $\mu = 200$.

The same type of reasoning concerning the skin effect may be applied to the two layer laminar structure in the aforesaid patent. Below the Curie temperature, the majority of the current flows in the magnetic layer when the thickness of this layer is nominally one skin depth of the material below the Curie temperature. In the region of the Curie temperature, the majority of the current now flows in the copper and the resistance drops dramatically. If the thickness of this high mu material were greater than two skin depths, the percentage change of current flowing in the high conductivity copper would be less and the resistivity change would not be as dramatic. Similarly, if the thickness of the high mu material were materially less than one skin depth, the percentage of current flowing in the high resistivity material at a temperature less than the Curie temperature would be less so that the change of resistance at the Curie temperature would again not be as dramatic. The region of 1.0 to perhaps 1.8 skin depths of high mu material is preferred.

An exact relationship for the two layer case is quite complex. The basic mathematical formulas for surface impedance from which expressions can be obtained for the ratio of the maximum resistance, $R_{max}$, below the Curie temperature, to the minimum resistance, $R_{min}$, above the Curie temperature, are given in Section 5.19, pp. 298-303 of the standard reference, "Fields and Waves in Communications Electronics," 3rd Edition, by S. Ramo, J. R. Winnery, and T. VanDuzer, published by John Wiley and Sons, New York, 1965. Although the theory described in the above reference is precise only for the case of flat layers, it is still accurate enough for all practical applications in which the skin depth is substantially less than the radius of curvature.

The above facts are clearly demonstrated by the curves A and B of the graphs of FIG. 1 hereof which are based on the two-layer theory in the above reference. These curves are plots of autoregulation power ratio as a function of frequency of the current applied to the patented devices. The maximum autoregulation power ratio is achieved at 0.6 MHz for a material having a mu of 600, $\rho_1 = 75 \times 10^{-6}$ ohm-cm and a thickness of $1.5 \times 10^{-3}$ inch as illustrated in Curve B. In this case, one skin depth is $0.9 \times 10^{-3}$ inch and the peak ratio of 162 occurs at a frequency of 600 KHz. As indicated above, the thickness of the high mu layer is $1.5 \times 10^{-3}$ inch. Thus, the theoretical optimum thickness is 1.67 times one skin depth thickness below the Curie temperature.

The curve A is for a body having a first lamina of a thickness of $0.5 \times 10^{-3}$ inch. It is noted that the peak ratio of 160 is attained at 6 MHz, at which frequency the skin depth in the magnetic material is $0.29 \times 10^{-3}$ inches.

Difficulty may arise in such devices when the Curie temperature is achieved due to spread of the current and/or magnetic flux into adjacent regions outside of the device, particularly if the device is located close to sensitive electrical components.

In copending patent application Ser. No. 243,777, filed Mar. 16, 1981 now U.S. Pat. No. 4,701,587 issued Oct. 20, 1987, a continuation-in-part application of the application from which the aforesaid patent matured, there is described a mechanism for preventing the high frequency field generated in the heated device from radiating into the regions adjacent the device. This effect is accomplished by insuring that the copper or other material of high conductivity is sufficiently thick, several skin depths at the frequency of the source, to prevent such radiation and electrical field activity. This feature is important in many applications of the device such as a soldering iron where electromagnetic fields may induce relatively large currents in sensitive circuit components which may destroy such components.

As indicated above, the magnetic field in a simple, single layer, i.e., monolithic structure, falls off as $e^{-x}$ so that at three skin depths, the field is 4.9% of maximum, at five skin depths, it is 0.67%, and at ten skin depths, the field is 0.005% of maximum. For many uses, thicknesses of three skin depths are satisfactory although ten or more may be required with some highly sensitive devices in the vicinity of large heating currents.

The devices of the patent and application are operative for their intended purposes when connected to a suitable supply, but a drawback is the cost of the high frequency power supply. Where only a very low field may be permitted to radiate from the device, the frequency of the source is preferably maintained quite high, for instance, in the megahertz region, to be able to employ copper or other non-magnetic material having reasonable thicknesses.

In accordance with the invention of my co-pending application entitled "Autoregulating Electrically Shielded Heater, " Ser. No. 430,317 filed on Sept. 30, 1982, now abandoned and continuation-in-part Ser. No. 543,443 filed Oct. 19, 1983, a relatively low frequency constant current source may be employed as a result of fabricating the normally non-magentic, low resistivity layer from a high permeability, high Curie temperature material. Thus, the device comprises a high permeability, high resistivity first layer adjacent the current return path and a high permeability, preferably low resistivity second layer remote from the return path; the second layer having a higher Curie temperature than the first mentioned layer.

As used herein, the term "high magnetic permeability" refers to materials having permeabilities greater than paramagnetic materials, i.e., ferromagnetic materials, although permeabilities of 100 or more are preferred for most applications.

The theory of operation underlying the invention of the aforesaid application filed on Sept. 30, 1982 is that by using a high permeability, high Curie temperature material as the low resistivity layer, the skin depth of the current in this second layer is such as to confine the current to a quite thin layer even at low frequencies thereby essentially insulating the outer surfaces electrically and magnetically but not thermally with a low resistivity layer of manageable thickness. The second layer is preferably formed of a low resistivity material, but this is not essential.

An example of a device employing two high mu laminae utilizes a layer of Alloy 42 having a resistivity of about 70–80 micro-ohms-cm, a permeability about 200, and a Curie temperature of approximately 300° C. A second layer is formed of carbon steel having a resistivity of about 10 micro-ohms-cm, a permeability of 1000, and a Curie temperature of about 760° C. The skin depths, using a 60 Hz supply are 0.1" for Alloy 42 and 0.025" for carbon steel. An example of a practical 60 Hz heater based on the present invention, may employ a coaxial heater consisting of a 0.25 inch diameter cylindrical or tubular copper conductor (the "return" conductor), a thin layer (perhaps 0.002 in thickness) of insulation, followed by the temperature sensitive magnetic alloy having a permeability of 400 and a thickness of 0.1 inch, and finally an outer jacket of steel having a permeability of 1000 and a thickness of 0.1 inch. The overall heater diameter would be a 0.65 inch. If the heater is used in a situation requiring 5 watts per foot of heater length for, for instance, protection of a liquid against freezing, the total length of the heater is 1000 feet, the resistance of the heater will be 1.96 ohms. The current will be 50 amperes, and the voltage at the generator end will be 140 volts at temperatures somewhat below the Curie temperature of the temperature sensitive magnetic alloy on the inside of the outer pipe. If there were substantial changes in the electrical resistance due to variations of the thermal load, the required voltage must vary in order to maintain constant current. Either of these latter supplies provide current at costs considerably less than a constant current supply at 8–20 MHz.

The power regulation ratios (AR) in such a device; 2:1 to 4:1, are not as high as with the device of the patent with a resistivity difference of about 10:1, but the AR difference may be reduced by using materials of higher and lower resistivities for the low Curie temperature and high Curie temperature materials, respectively. Also, a high mu, relatively low resistivity material such as iron or low carbon steel may be employed to further increase the power regulation ratio.

Referring to FIG. 2 of the accompanying drawings, Curves A and B are plots of the autoregulating power ratios for the dual magnetic layer apparatus of the co-pending application. It will be noted again that the autoregulating ratio of the device of the prior patent as depicted by Curve B of FIG. 1 rises to 160 at 7 MHz with a first layer thickness of $0.5 \times 10^{-3}$ inch and copper as the second layer. As depicted by Curve A of FIG. 2, at 60 Hz with a first layer thickness of 0.125 inch, a ratio of 1.6 is attained at 60 Hz and a ratio of 4 at 1000 Hz. A ratio of 4 is attained as shown in Curve B of FIG. 2 with a different first layer thickness of 0.010 at 180 KHz. These ratios are attained with layers of Alloy 42 and carbon steel as previously indicated.

SUMMARY OF THE INVENTION

In accordance with the present invention, autoregulating power ratios of 6:1 to 7:1 are attained while retaining the ability to utilize low frequency supplies without producing unacceptable levels of field radiation.

The objects of the invention are achieved by providing a region of high conductivity at the interface of the two members having high permeability of the application filed on Sept. 30, 1982.

The material in the interface region may be copper, for instance, or other highly conductive material. The material may appear as a separate layer, a sandwich of magnetic, non-magnetic and magnetic material or may be bonded to the high and/or low Curie temperature, ferromagnetic layers at the interface to provide a low resistivity, interface region.

Typical thicknesses of the sandwich construction at 1 KHz are 0.03" for both the low and high Curie temperature ferromagnetic materials, respectively, and 0.010 inch for the copper layer.

In operation, as the Curie temperature of the first layer is approached and its permeability rapidly decreases, the current spreads into the copper layer and into the second magnetic layer. The total resistance of the structure, due to the presence of the copper, drops dramatically providing a high autoregulating ratio. Also, most of the current is confined to the copper layer and only a small percentage penetrates into the second magnetic layer. In consequence, this latter layer need be only 3 to 5 skin depths thick to effect virtually complete shielding of the device. Thus, the object of a large autoregulating power ratio in a relatively small device using a low frequency source is achieved. By low frequency is meant a source in the range of 50 Hz to 10,000 Hz although 50 Hz–8000 Hz is fully adequate.

With autoregulating ratios of 6:1 and 7:1, the heating variations below and above Curie temperature are quite large so that the apparatus may respond rapidly to thermal load variations and thus maintain accurate temperature regulation in a small device operating at low frequency.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawing, wherein:

FIG. 5 is a series of graphs illustrating characteristics of the power versus temperature characteristics of the apparatus of the present invention in comparison with those of the aforesaid Carter and Krumme patent and my application filed on Sept. 30, 1982.

DESCRIPTION OF THE PREFERRED EMBODIMENTS

Figure 3:
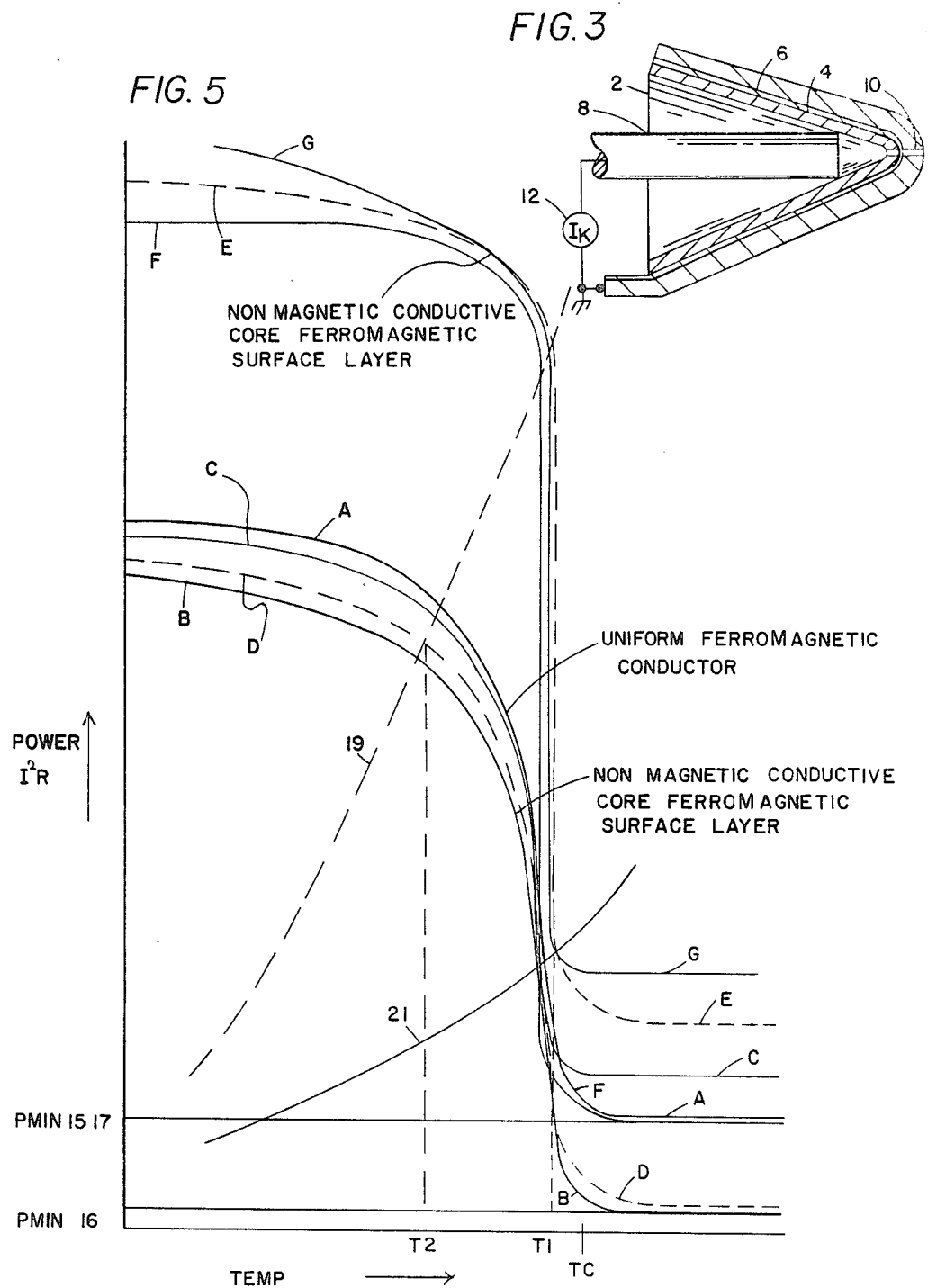
FIG. 3 is a view in cross section of a soldering iron fabricated in accordance with the present invention.

Referring now specifically to FIG. 3 of the accompanying drawings, there is illustrated in cross section, a soldering iron tip fabricated in accordance with the present invention. The drawing illustrates an inner cone 2 of high permeability, high resistivity, low Curie temperature material, some examples of which, with their compositions, permeabilities, resistivities, and Curie temperatures are listed in Table 1 below:

TABLE 1

| MATERIAL | CURIE POINT | ρ | EFFECTIVE PERMEABILITY |
|---|---|---|---|
| 30% Ni Bal Fe | 100° C. | 80 × 10⁻⁶ | 100–300 |
| 36% Ni Bal Fe | 279° C. | 82 × 10⁻⁶ | ↓ |
| 42% Ni Bal Fe | 325° C. | 71 × 10⁻⁶ | 200–600 |

TABLE 1-continued

| MATERIAL | CURIE POINT | ρ | EFFECTIVE PERMEABILITY |
|---|---|---|---|
| 46% Ni Bal Fe | 460° C. | 46 × 10⁻⁶ | ↓ |
| 52% Ni Bal Fe | 565° C. | 43 × 10⁻⁶ | ↓ |
| 80% Ni Bal Fe | 460° C. | 58 × 10⁻⁶ | 400–1000 |
| Kovar | 435° C. | 49 × 10⁻⁶ | ↓ |

An outer cone 4 is formed coaxial with and about the cone 2. The cone 4 is fabricated from a high permeability, preferably low resistivity and high Curie temperature material, examples of which are set forth in Table 2 below:

TABLE 2

| MATERIAL | CURIE POINT | ρ | EFFECTIVE PERMEABILITY |
|---|---|---|---|
| Low Carbon Steel | 760° C. | 10 × 10⁻⁶ | >1,000 |
| Cobalt | 1120° C. | 9.8 × 10⁻⁶ | >1,000 |
| Nickel | 353° C. | 6.8 × 10⁻⁶ | >500 |

A layer 6 of high conductivity material such as copper is interposed between layers 2 and 4. The layer 6, as previously indicated, may be a separate layer or may be bonded to layer 2 and/or layer 4 along the interface between the layers.

A low resistance, cylindrical rod or tube 8, copper, for instance, extends along the axis of the cones 2 and 4 and is insulated therefrom except at the apex of the cones 2 and 4 and the layer 6. In one form of the invention, the apices of the cones 2 and 4 are drilled to a size to snuggly receive a small diameter extension 10 of the rod 8 which extension is suitably electrically in contact with the layers 2, 4 and 6 and mechanically secured (as by swaging or welding) in the passage through the apices of the cones 2 and 4. The extension 10 may terminate flush with the narrow end of the outer cone 4.

To complete the Figure, a constant current, a.c. supply 12 is connected between the center conductor and the large diameter ends of the cones 2 and 4.

Upon excitation of the supply 12, alternating current flowing in the circuit is confined to the surface of the cone 2 adjacent the return path, i.e., the rod 8. The power dissipated is determined by the equation $P = I^2 R_1$ where $I^2$ is a constant "K" due to the use of the constant current supply 12 and $R_1$ is the resistance of the cone 2 at the frequency of the source. The resistance of the cone 2 is a function of the resistivity of the material and also the cross section of the cone 2 to which the current is confined by skin effect. Specifically, resistance is an inverse function of cross-sectional area so that as the cross section of the cone to which the current is confined decreases, as a result of increase in skin effect, the higher the resistance of the cone 2.

As previously indicated, the formula for skin depth in a monolithic material is $S.D. = 5030 \times 10^3 \sqrt{\rho/\mu f}$ cm in cgs units, where $\rho$ is resistivity, $\mu$ is magnetic permeability and f is the frequency of the source. It is quite apparent the skin depth decreases with increase in frequency and thus the effective resistance increases with frequency.

In the present invention, power supplies of relatively low frequencies, i.e., 60 Hz to 10 Khz, may be employed. In such a case, the effective cross-sectional area of the current path is considerably greater than in the prior art device in which frequencies of 8–20 MHz are employed. For instance, skin depth at 60 Hz of Alloy 42 is 0.125" at a permeability of 300, but is 0.0004" at 8 MHz. Thus, at 60 Hz, the thickness of the Alloy 42 layer is larger and resistance of the optimum laminar structure is less than at 8 MHz. High resistivity materials are preferably employed for the cone 2 in accordance with the present invention in order to provide the high resistance, below Curie temperature necessary to produce the marked change in resistance at the Curie temperature required to produce the desired change in heating in accordance with the formula P=KR. Specifically, in order to autoregulate temperature, the resistance of the circuit must decrease materially when the Curie temperature of the material of cone 2 is approached. A power ratio of say, 6 to 1, provides excellent regulation for most purposes and for a soldering iron, ratios of 3 to 1 are perfectly acceptable for substantially all uses. As pointed out in the aforesaid U.S. Pat. No. 4,256,945, in a solid, i.e., monolithic material, the ratio of resistance values at a given frequency is a function of permeability and resistivity.

$$\text{Thus, } \frac{R_{max}}{R_{min}} = \sqrt{\frac{\mu_r\text{max }\rho\text{max}}{\mu_r\text{min }\rho\text{min}}} \tag{1}$$

Since $\rho$ does not change appreciably with temperature and $\mu$ falls to 1 at the Curie temperature, a permeability of 200 would lead to a resistance change in solid alloy 42 of $\sqrt{200}=14.14$. The current in a composite, i.e., laminar, structure is no longer confined to this layer; in fact, a large majority of the current flows in the cone 4 and layer 6 at the Curie temperature. Thus, the resistivity of the material of the cone 4 and layer 6 becomes important. Specifically, the resistivity of the layer 6 must be considered, since being of appreciably lower resistance, the majority of the available, i.e., constant current, will be concentrated in this layer.

In operation, when curent is initially applied to the apparatus, the current is confined to the cone 2 which is, in the example discussed herein, 0.125" thick; this being one skin depth of Alloy 42 at 90 Hz. The device heats until the Curie temperature of the material, about 325° C. in the example is approached at which point the permeability decreases and the current begins to spread into the layer 6 and cone 4. The temperature of the material of the cone 4 is still well below its Curie temperature and the current is confined to the cone 2, the layer 6, and to a few skin depths of the cone 4 at 90 Hz, i.e., approximately 0.021".

Figure 2:
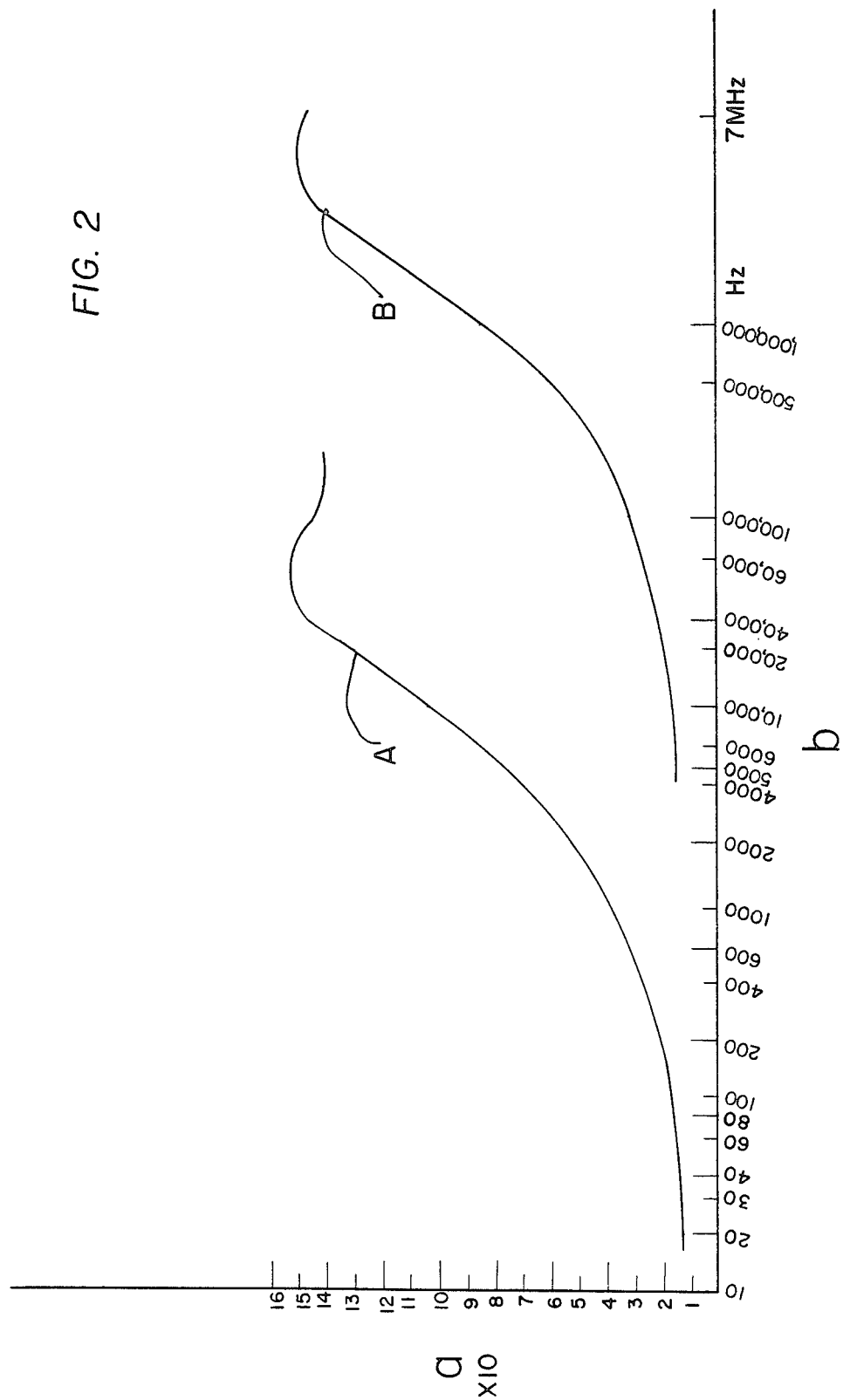
FIG. 2 is a graph comparing the autoregulating versus frequency characteristics of the apparatus of my application filed on Sept. 30, 1982 for different thicknesses of the lower Curie temperature material.
Figure 4:
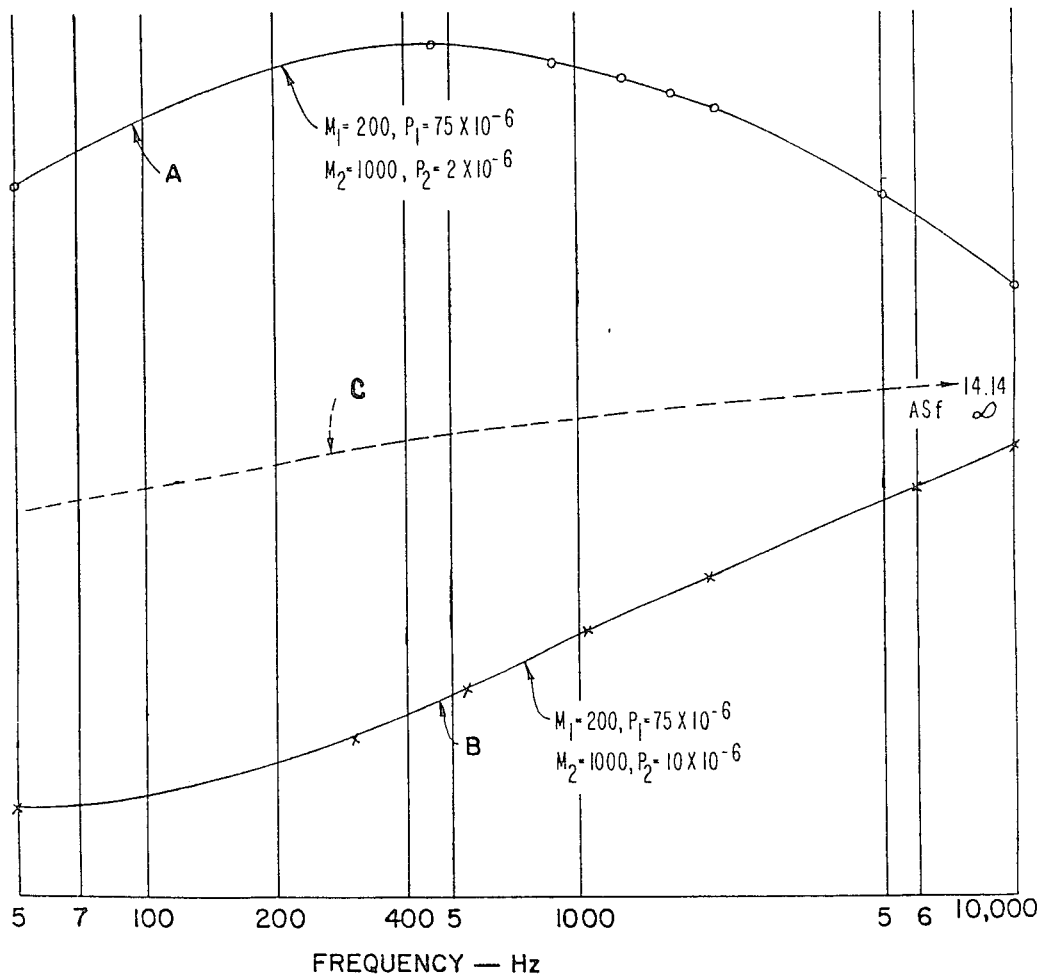
FIG. 4 is a series of graphs comparing the autoregulating characteristics of the device of the present invention with the devices of the prior patent and the application filed on Sept. 30, 1982.

Referring to FIG. 4 of the accompanying drawings, there are presented plots of the autoregulating power ratios of two and three-layer structures including the present invention. Curve A illustrates performance of the two-layer structure in which the second layer is nonmagnetic. Curve B is also for a two-layer structure, the second layer being magnetic. On Curve A, the first layer has approximately the characteristics of Alloy 42 ($\mu=200$ and $\rho=75$ microhm-centimeters) and the second layer has the characteristics of copper ($\mu=1$ and $\rho=2$ microhm-centimeters). This structure, which corresponds to U.S. Pat. No. 4,256,945 of Carter and Krumme has a higher autoregulation ratio than the structure illustrated by Curve B in which the second layer is magnetic, having a permability of 10000. The second layer in Curve B has the electrical characteristics of low carbon steel ($\mu=1000$ and e=10 microhm-centimeters). Curve B is a duplicate of the curve A in FIG. 2 in the frequency range between 50 Hz and 10,000 Hz.

Curve B describes the performance of two-layer structures in which the second layer is magnetic. In the present invention, as previously indicated, a third layer (layer 6) of highly conductive material such as copper is placed between these two magnetic layers. Referring to Curve C, when the Curie temperature is reached, the resistance drops by a factor larger than that obtained when two magnetic layers are used (Curve B) and smaller than that obtained when the second layer was non-magnetic (Curve A). Thus, the autoregulation ratio of the present invention falls in the range between Curve A and Curve B. An approximate analysis of the situation has been used to calculate the autoregulation power ratio based on the following assumptions:

1. That very little current flows in the third, magnetic layer;
2. That the thickness of the first layer is nominally one skin depth at temperatures below the Curie temperature; and
3. That at temperatures above the Curie temperature, the first two layers are much less than one skin depth thick.

With these assumptions, the resistance below the Curie temperature is proportional to the resistivity of the first layer, and above the Curie temperature, the current divides between the first and second layers as though they were in electrical parallelism. Thus, for equal thickness, first and second layers and assuming the above first-layer characteristic of Alloy 42 (given above) and a second layer of copper, the resulting autoregulation ratio would be approximately 7 at 60 Hz, if the first layer thickness were 0.125 inch and the second layer thickness 0.020 inch. This point is shown in Curve C of FIG. 4 which is an estimate of the performance of the apparatus. It is also quite reasonable to suppose that the autoregulation ratio increases to a maximum of $\sqrt{200}=14.14$ at higher frequencies where the thickness of the first layer is several skin depths at temperatures below the Curie point.

As indicated above, the curves of FIG. 4 are based on a thickness of layer 2 of 0.125" and a thickness of layer 6 of 0.020" and a frequency in the range of 50 to 10,000 Hz. This approach was taken to illustrate the ability of the apparatus of the present invention to operate at good autoregulation ratios at frequencies as low as 50 Hz.

Figure 1:
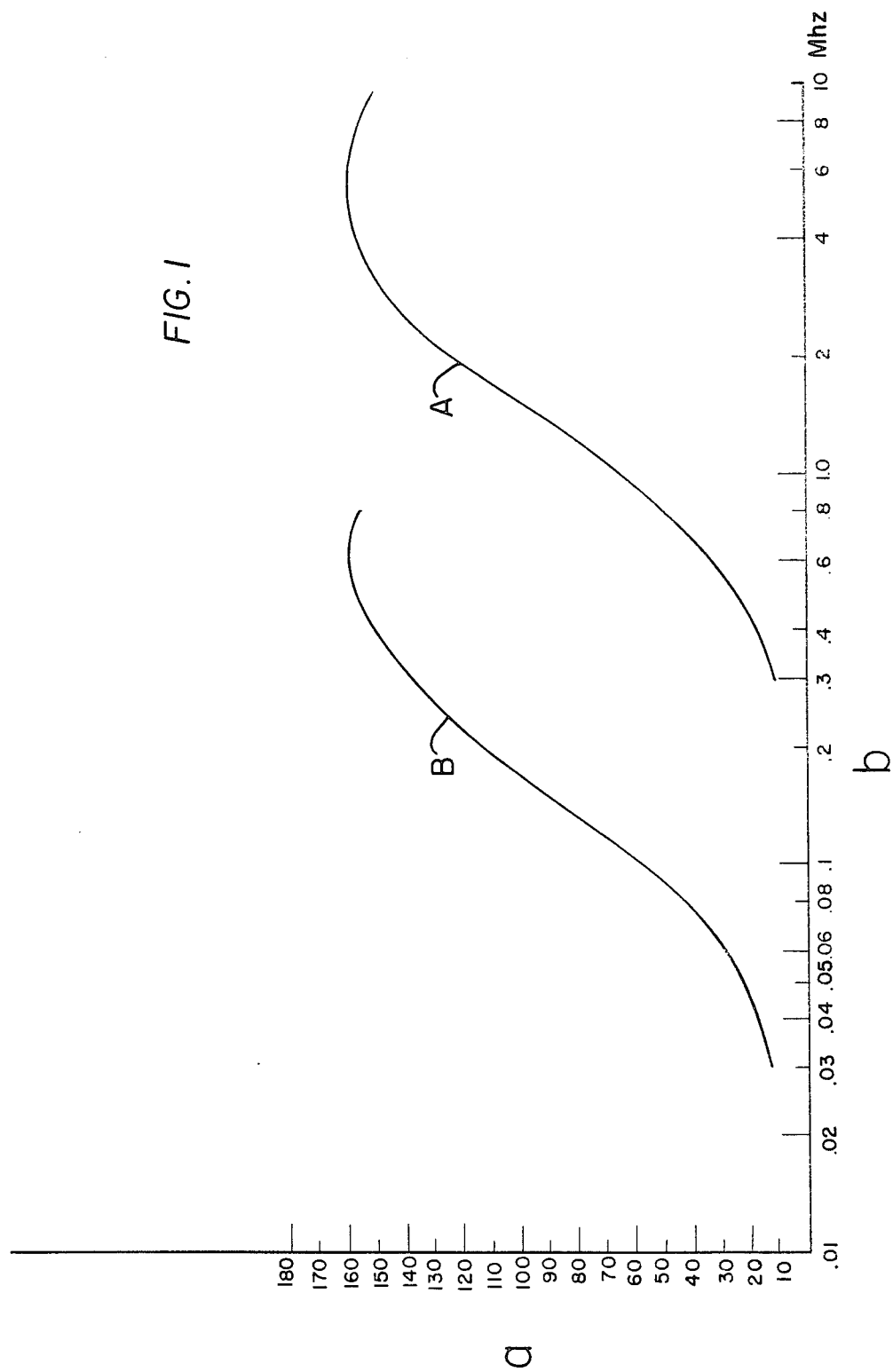
FIG. 1 is a graph comparing the autoregulation ratios versus frequency characteristics of the apparatus of the aforesaid Carter and Krumme patent, for different thicknesses of the magnetic layer.

Referring again to FIG. 4, as indicated above, Curve C is a plot of autoregulating power ratios for the apparatus of the present invention. It will be noted again that the autoregulating ratio of the device of the prior patent, as depicted by the Curve A in FIG. 1, rises to 162 at 6 MHz with a first layer thickness of $0.5\times10^{-3}$ inch and copper as the second layer. As depicted by Curve C in FIG. 4, at 60 Hz, with a first layer thickness of 0.125 inch and a copper layer of 0.020 inch, a ratio of 7.5 is attained with a ratio of 12 at 1000 Hz. These ratios are obtained with layers of Alloy 42, copper and carbon steel as previously indicated.

Greatly improved autoregulation ratios can be achieved operating at higher frequencies with layer thickness tailored to such frequency. At 8,000 Hz in the following example, the skin depth of Alloy 42 with a permeability of 200 is 0.0133" and with a desired thickness of 1.8 skin depths, it is 0.024". The thickness of the copper is still 0.02" and thus, the thickness of the two layers is approximately the same. The current in the two layers, therefore, divides roughly as the inverse of their resistivities and the majority of the current flows in the copper. The autoregulation ratio now becomes about 37.5 as opposed to approximately 14 in the Curve C of FIG. 4.

The curves of FIG. 5 are referred to; FIG. 5 being a power vs. temperature curve that is of the type illustrated in FIG. 3 of the aforesaid U.S. Pat. No. 4,256,945. Graph A of of FIG. 5 is a plot of Power Dissipated ($I^2R$) vs. Temperature for a uniform, i.e., non-laminar, magnetic conductor. Equation 1 is applicable, the changes in power level being, namely, a function of the changes of resistivity which are very small and changes in permeability which in the example may vary from 300 to 1.

Graph B is a plot for the device of the aforesaid patent. In this arrangement, the power dissipation below Curie temperature is less than in the non-laminar device of Curve A due to the fact that some of the current flows in the copper which has a markedly lower resistance than the magnetic layer. At or near the Curie temperature, Curve B dips to a very low value due to flow of a majority of the current in the copper. Both resistance and permeability have undergone significant reductions. The overall change in power dissipated in the device of Curve B is thus greater than in the case of the solid magnetic structure.

Reference is now made to Curve C which is for the device of the copending application filed on Sept. 30, 1982. It is seen that below the Curie temperature the power dissipated by the prior device is less than for Curve A, but more than for Curve B since the resistance ratios dominate. There is little resistance change with temperature for Curve A, but a large change for Curve C. Above the Curie temperature, the permeability ratios dominate, and since one layer of the present device remains magnetic, permeability and resistivity do not change as much as in the other two laminated devices and more power is dissipated. Thus, the power dissipation ratio for the present device is not as great as for the monlithic device or for the others. However, the device of Curve C has an advantage of size and cost over the solid conductor device and an advantage of cost over the patented device.

The performance of the device of the present invention is illustrated by Curve D. This curve shows that below Curie temperature, the power dissipated is less than for a monolithic device but slightly greater than the device of the prior patent since all of the current that is not confined to layer 2 is not concentrated in layer 6. A small part of the current, perhaps 10%, spreads into the layer 4 which has a higher resistance than copper. Thus, the overall resistance of the device is slightly higher than in the patented device.

Above the Curie temperature, the power dissipated is greater than in the case of the patented device, but considerably less than in the monolithic case and in the device of the copending application. The power dissipated relative to the patented device is greater since the resistivity of layer 4 is greater than that of copper, layer 6.

Thus, the autoregulation power ratio of the present invention at 60 Hz and the sizes specified falls between 3:1 and 10:1, about 6:1 to 7:1 which is more than adequate for the majority of temperature regulating uses while retaining the low cost of the low frequency supply. Further, in the apparatus of the copending application filed on Sept. 30, 1982, Curve C; above the Curie temperature of the layer 2, the current is concentrated in the layer 4 and its distribution is basically exponential. In the present case, the majority of current is confined to the layers 2 and 6 (perhaps 90%) and only a relatively small part of the current is found in layer 4. Thus, the layer 4 of the present invention may be thinner than the layer 4 in the copending application by an amount greater than the thickness of the copper layer, without losing any of the desired shielding effect.

In order to provide adequate protection against magnetic radiation and electrical short circuit or drain, the thickness of the cone 4 must be at least several times the skin depth. At a frequency of 60 Hz, the cone 2, at a mu of 300, may be 0.125" and the cone 4 may be $3 \times 0.025$; the factor 0.025 being skin depth which is multiplied by 3 to prevent consequential magnetic radiation and current leakage to the surface of cone 4. In an annular device, all transverse dimensions are multiplied by two, so thicknesses apart from the 0.15 diameter center conductor rod are $2(0.125+0.020+3\times0.025)=0.440$. With a 0.15" diameter center conductor added, the diameter is 0.590. At 10 KHz, the diameter is 0.10 with a 0.025" diameter center conductor rod.

It should be noted that the calculations set forth in FIGS. 1, 2, 4 and 5 are based on the use of Alloy 42 with permeabilities in the range 200 to 600 and resistivity of about $75 \times 10^{-6}$ ohm-cms and carbon steel with a permeability of about 1000 and resistivity of about $10 \times 10^{-6}$ ohm-cms. The use of these materials has been chosen for the example since they are readily available. Other combinations of materials of Tables I and II may be employed.

The use of the devices of the present invention permits the use of low frequency sources without radiation or harmful electromagnetic energy even in units with small dimensions.

The Curves 19 and 21 of FIG. 5 represent the rate of heat dissipation as a function of temperature of two different loads on the device of the present invention and the related devices illustrated in that Figure. The Curve 21 is representative of a lesser heat load than Curve 19 and equilibrium is achieved at a temperature $T_1$ at the interaction of Curves D and 21. The curves intersect along a steep part of Curve D and thus the temperature variation with load changes is not great.

If, however, the rate of heat dissipation is increased, as represented by Curve 19, the Curve D is intersected at a point on its characteristic having a low response and the temperature variation is at least from $T_1$ to $T_2$. If this variation exceeds the design parameters of a particular system, the constant current to the device may be increased so that the Curve E now represents the characteristic of the device. Under these conditions, the Curve 19 intersects Curve E along a virtually vertical portion of the Curve and good temperature regulation is again achieved. It is essential, however, that the heat dissipation Curves do not intersect the power vs. temperature curve along the horizontal part of the curve at the right of the Figure since equilibrium would probably not be achieved below destruction temperature.

The results of the present invention are achieved by employing a sandwich of copper between high permeability materials, one with low resistivity and the other with a high resistivity. It should be noted that the permeabilities of the two magnetic layers may be the same; the major requirement being that the outer laminate having a higher Curie temperature than the inner laminate.

Although the invention is disclosed as employed in a soldering iron, it is obviously useful in many fields where low cost, well regulated heating is desired, such as scalpels, deicers for aircraft, etc. Such devices may also be cylindrical such as in FIG. 1 of the aforesaid patent in which case the position of the laminae is reversed, i.e., the lower Curie temperature material surrounds the higher Curie point material. Also, the device may be flat as in a scalpel or an elongated heating element for heating pipes.

The present invention is not intended to be limited to use with laminated structures only. Non-laminated members in electrical contact with the copper strip will function in the present invention; the uniformity and extent of electrical contact determining the actual performance of such a device.

The frequency of the supply utilized herein is not restricted to a specific range of frequencies. Operation above the range of 1000 to 5000 Hz increases performance very little unless frequencies sufficiently high to significantly increase the resistance of the first layer are employed. Such frequencies, however, are not normally anticipated in view of the large additional cost of the supplies as a function of improved performance.

The term "constant current" as employed herein does not mean a current that cannot increase but means a current that obeys the following formula:

$$\Delta I/I < -(\tfrac{1}{2}\Delta R/R). \qquad (2)$$

Specifically, in order to autoregulate, the power delivered to the load when the heater exceeds Curie temperature, must be less than the power delivered to the load below Curie temperature. If the current is held invariable, then the best autoregulating ratio is achieved short of controlling the power supply to reduce current. So long, however, that the current is reduced sufficiently to reduce heating, autoregulation is achieved. Thus, when large autoregulating ratios are not required, constraints on the degree of current control may be relaxed thus reducing the cost of the power supply.

The above equation is derived by analyzing the equation:

$$P = (I + \Delta I)^2$$

(R+ΔR where P is power, differentiating P with respect to R)

$$dP/dR = I^2 + 2RI(dI/dR)$$

and to satisfy the requirements for autoregulation dP/dR>0. Thus, $I^2 + 2RI(dI/dR) > 0$ which reduces to Equation 2 above.

In the apparatus as illustrated in FIG. 3, the magnetic circuit is completely closed on itself and such is the preferred structure since no demagnetizing effects are realized due to flux leakage. Non-continuous paths can be used if the thickness of the magnetic layer is quite small relative to the surface area of the layer whereby the leakage flux constitutes an insignificant part of the total flux.

Once given the above disclosure, many other features, modifications and improvements will become apparent to the skilled artisan. Such other modifications, features and improvements are, therefore, considered a part of this invention, the scope of which is to be determined by the following claims:

I claim:

1. An element for an autoregulating heating device comprising:
    a laminated structure having at least a first lamina and a second lamina, both being of a material having a high magnetic permeability,
    said first lamina being of a material having a lower Curie temperature than said second lamina,
    a low resistance layer in electrical contact with both said laminae along their adjacent surfaces, and
    means connecting said element across a source of constant current such that said laminae and said layer are connected in parallel across such a source whereby below the Curie temperature of said first lamina the current is substantially confined to said first lamina.

2. The element according to claim 1 wherein the resistivity of said first lamina is in the range of two to ten times the resistivity of said second lamina and the resistivity of the low resistance layer is lower than the resistivity of the second lamina.

3. The element according to claim 1 or claim 2 wherein said low resistance layer is a separate layer from said first and second lamina.

4. An autoregulating heating device including the element of claim 1 and comprising:
    means connecting said element to a constant current alternating current source to establish a current in said element,
    said element adapted to be connected across said source such that the current through said laminae are in parallel and parallel to the surfaces of contact between said layer and said laminae.

5. The element according to claims 1 and 2 wherein said first and second laminae are hollow geometric members each generated by rotating a line about a second line as its axis whereby to define two laminae having one end of each adjacent one end of the other lamina,
    a conductive member extending generally coaxial of and within said first lamina, and
    one end of said conductive member in contact with both said laminae and said layer at said adjacent ends of said laminae.

6. The element according to claim 5 further comprising:
    a constant current source connected across said conductive and said element remote from said one end of said conductive.

7. A structure comprising:
    a first member of a material having a high magnetic permeability,
    a second member of a material having a high magnetic permeability,
    said first member having a lower Curie point than said second member,
    a region of higher conductivity than said first and second members contacting both said members over a coextensive length of each,
    said structure having means for connecting said members across an alternating, constant current source such that current will flow through a coextensive length of said members to induce parallel flow of currents through said members.

8. An autoregulating heating device including the structure of claim 7 and further including an alternating current, constant current source of a frequency in a range of approximately 50 Hz and higher, means connecting said source across said lengths of said members.

9. The method of autoregulating temperature of a heater of small size at low frequencies comprising the steps of providing a laminated structure having at least first and second layers of high magnetic permeability material having different Curie temperatures, locating a low resistance non-magnetic layer between and in electrical contact with the first and second layers, and applying a constant current alternating current across the laminated structure to cause current to flow in parallel in the laminae and layer of the laminated structure.

10. The method of autoregulating temperature of a heater of small size at low frequency excitation from a constant current source comprising the steps of applying a constant, alternating current to a structure at a frequency to confine a large portion of the current to a first high resistance ferromagnetic layer of a device having a second higher resistance ferromagnetic layer and a low resistance non-magnetic layer located between and in electrical contact with both said first and second layers causing the current to spread into the other two layers as the Curie temperature of the first ferromagnetic layer is approached whereby the current is concentrated in the non-magnetic layer and the current in the second ferromagnetic layer is confined to a narrow region adjacent the non-magnetic layer.

11. The device according to claim 4 wherein said constant current source is connected to and maintains a current in said heating device satisfying the equation:

$$\Delta I/I \leq -\tfrac{1}{2} \Delta R/R$$

where $\Delta I$ is the change in current $I$ in the heating device and $\Delta R$ is the change in resistance $R$ of the heating device upon the heating device reaching Curie temperature.

12. A heating element comprising
a first conductor having a large area surface,
a second conductor having a large area surface,
a low resistance non-magnetic layer in electrical contact with both said large area surfaces of said conductors,
both said conductors having high magnetic permeabilities with one of said conductors having a higher Curie temperature than the other of said conductors, and
a current return path extending generally parallel to said conductors and located adjacent to the other of said conductors and remote from said one of said conductors,
said current return path connected in series with said conductors across a source of current.

13. The heater according to claim 12 wherein said first and second conductors and said low resistance layer are generally coextensive and said low resistance layer is in physical contact with both said surfaces, and wherein said current return path is connected to a common end of said conductors.

14. An electrical heater having intrinsic temperature control comprising
a center conductor having first and second ends,
a first hollow ferromagnetic member surrounding said conductor, and having inner and outer surfaces,
a second hollow magnetic member having inner and outer surfaces and disposed about said first member and having a higher Curie temperature than said first member,
said inner and outer surfaces of said second and first members respectively, being disposed adjacent one another,
a layer of non-magnetic high thermal and electrical conductivity material in electrical and thermal contact with said adjacent surfaces,
said members and said layer having first and second ends with the first end of each said members and said layer being electrically connected to said center conductor.

15. A heating element according to claim 12 wherein said one conductor has a lower resistivity than said other conductor.

16. An element according to claim 1 wherein the thickness of said element is three to ten times the skin depth of said element when said first laminae is non-magnetic and said second laminae is magnetic.

17. An element according to claim 1 wherein the thickness of said first lamina is 1 to 2 skin depths thick below Curie temperature at the frequency of operation of the element.

18. An element according to claim 1 wherein the thickness of said layer and first laminae combined are considerably less than one skin depth thick at the frequency of operation above Curie temperature of said first laminae.

* * * * *